United States Patent [19]
Patterson et al.

[11] Patent Number: 5,142,850
[45] Date of Patent: Sep. 1, 1992

[54] MOWER DECK HEIGHT ADJUSTMENT MECHANISM

[75] Inventors: Jon M. Patterson, Wauwatosa; Wayne R. Hutchison, Mayville; Richard D. Teal, Horicon, all of Wis.

[73] Assignee: Deere & Company, Moline, Ill.

[21] Appl. No.: 715,177

[22] Filed: Jun. 14, 1991

[51] Int. Cl.$^5$ ............................................ A01D 34/74
[52] U.S. Cl. ..................................................... 56/17.1
[58] Field of Search ........................ 56/17.1, 17.2, 214; 248/423, 157; 280/43.21, 43.17

[56] References Cited

U.S. PATENT DOCUMENTS

| | | | |
|---|---|---|---|
| 2,945,338 | 7/1960 | Burrows et al. | 56/17.2 |
| 3,512,344 | 5/1968 | Kortum | 56/17.1 X |
| 4,006,580 | 2/1977 | Kalleicher | 56/17.2 |
| 4,120,136 | 10/1978 | Rose | 56/17.1 |
| 4,577,455 | 3/1986 | Amano et al. | 56/17.1 |
| 4,733,522 | 3/1988 | Johansson | 56/17.4 |
| 4,869,057 | 9/1989 | Siegrist | 56/15.9 |

OTHER PUBLICATIONS

Parts Catalog published by John Deere Horicon Works in Aug. 1990 entitled "STX30 and STX38 Lawn Tractors", pp. 85-2 and 85-3.
Parts Catalog published by John Deere Horicon Works in Oct. 1988 entitled "170, 175, 180 and 185 Lawn Tractors", pp. 85-2 and 85-3.
Parts Catalog published by John Deere Horicon Works in Sep. 1990 entitled "GX70 and GX75 Riders", pp. 85-1.
Parts Catalog published by John Deere Horicon Works in Sep. 1990 entitled "LX172, LX176, LX178 and LX186 Lawn Tractors", pp. 85-12 and 85-13.
Parts Catalog published by John Deere Horicon Works in Jan. 1989 entitled "RX63, RX73, RX75, SX75, RX95, SX95 Riding Mowers", pp. 85-1, 85-2 and 85-6.
"Preliminary Feasibility Study" containing information generated and provided by employees of The Dow Chemical Co. and Deere & Co., pp. 1-205 including 4 (four) sub-lettered pages, co-generated prior to Sep. 1, 1989 and cofidentially shared between Dow and Deere in the U.S.

Primary Examiner—Stephen J. Novosad

[57] ABSTRACT

A mechanism for selectively adjusting the cutting height of a mower deck. A pivotal lift handle has a laterally extending first end portion for engagement with both of the operator's hands, and the lift handle is coupled with the deck for shifting the deck vertically as the lift handle pivots. A support member having a plurality of laterally spaced and vertically offset steps engagable with the lift handle is slidably carried by the vehicle frame and is selectively shiftable laterally by the operator to support the lift handle at a plurality of heights corresponding to respective lateral positions of the support member. A pivot rod member is pivotally coupled with the vehicle and is coupled with the support member for guiding the support member through a laterally extending arc. The pivot member is engagable by the thumbs of the operator to cause lateral shifting of the support member as the operator grasps and lifts the lift handle. A plurality of indexing means corresponding with respective step means are carried by the frame and engage the support member for blocking the support member from shifting laterally when the lift handle is not being lifted by the operator.

9 Claims, 4 Drawing Sheets

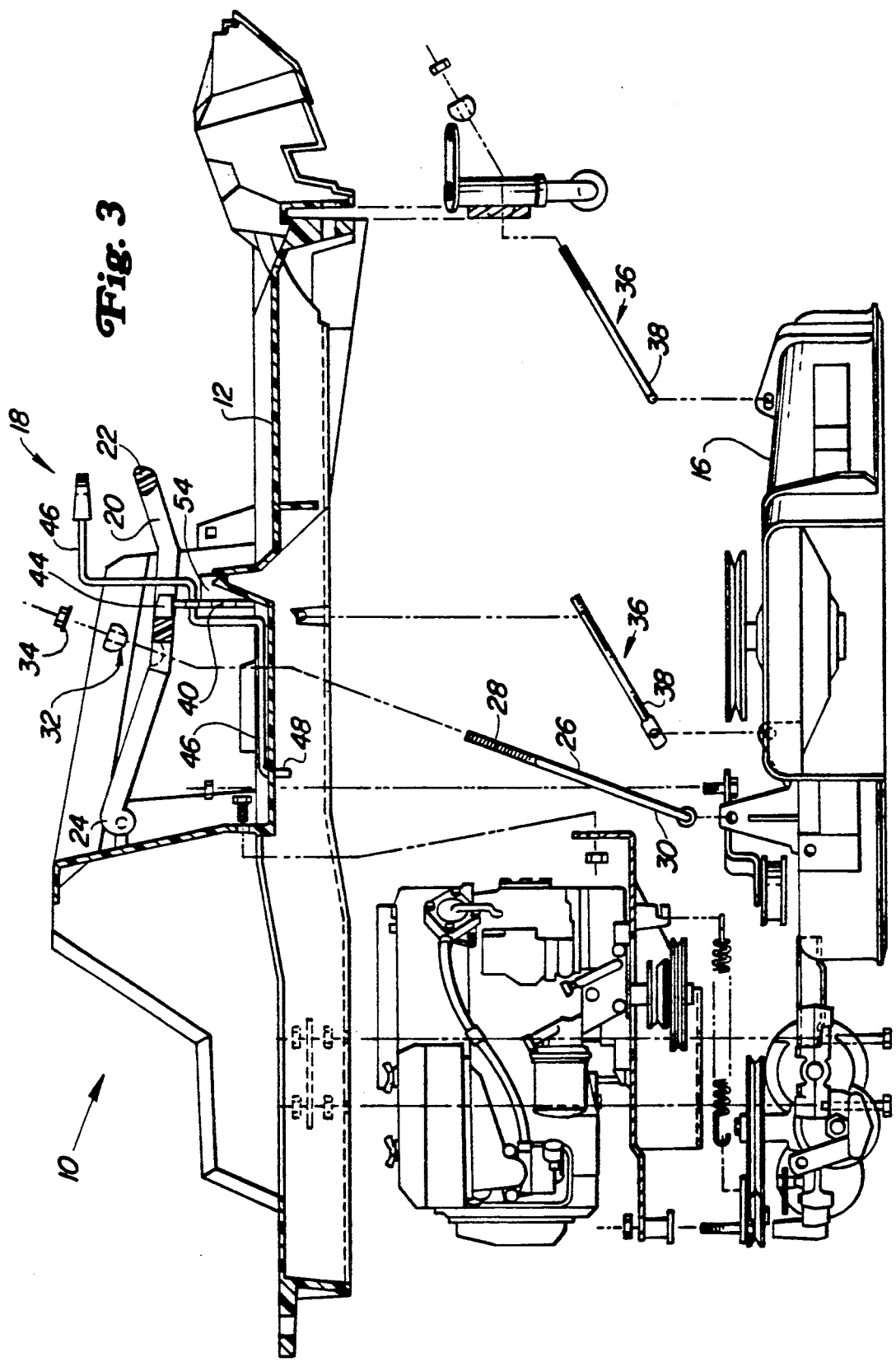

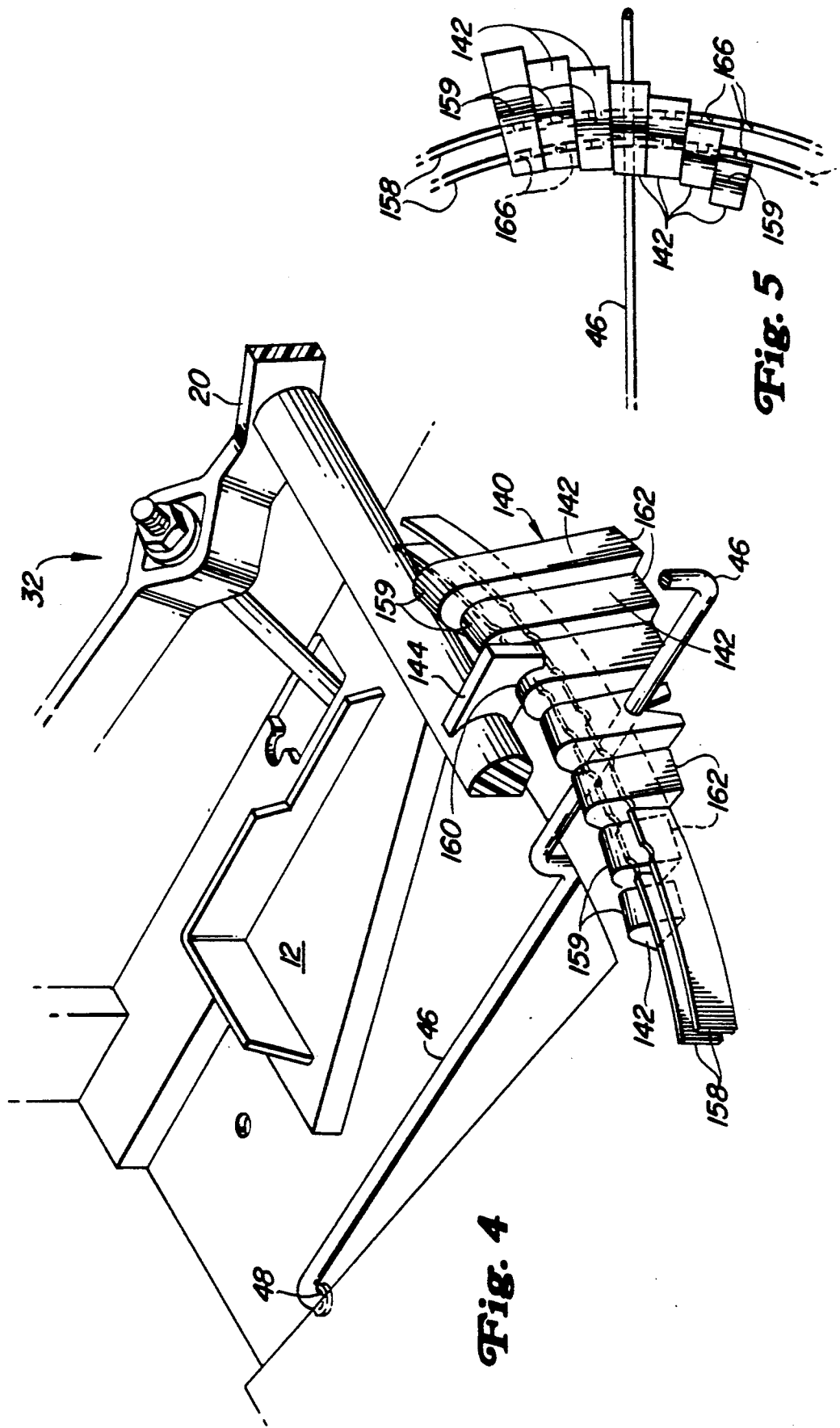

MOWER DECK HEIGHT ADJUSTMENT MECHANISM

BACKGROUND OF THE INVENTION

1. Field of the Invention

The invention relates to mechanisms for adjusting the cutting height of a mower deck suspended from a driven vehicle.

2. Description of the Related Art

A first type of mower deck height adjustment mechanism provides a lever arm that extends upwardly from the vehicle to be pivoted by one of the operator's hands. The lever is typically rigidly coupled with a laterally extending shaft that pivots about its own axis as the operator shifts the lever. The shaft is coupled with a linkage that acts to raise and lower the deck as the shaft rotates while maintaining the deck in a level or horizontal position. A locking mechanism is provided for securing the lever, shaft or linkage in a particular position to fix the deck's operating height. The locking mechanisms may provide a button carried at the end of the lever arm that can be depressed by the thumb of the operator. Another type of locking mechanism resiliently biases the lever arm into a row of slots, such that the operator must pivot the lever arm laterally to disengage the lever arm from the slots. The operator then pivots the lever arm longitudinally to vary the height of the mower deck, and the lever arm springs back into engagement with one of the slots to secure it in place.

This first type of height adjustment mechanisms and locking mechanisms include an undesirably large number of parts, such as lubricated pivot bearings and biasing springs. The cost of manufacturing and assembling the mechanism is therefore relatively high. Also, the operation of the first type of height adjustment mechanism may be difficult for the operator to execute due to the handle's position with respect to the operator station.

A second type of conventional mower deck height adjustment mechanism provides a lift arm carried on the vehicle between and beneath the operator's legs such that the operator can grasp and lift the lift arm with both hands while seated on the vehicle. The lifting operation is therefore easily accomplished since the operator can use both hands to lift the lift arm. A locking mechanism may be positioned adjacent the lift arm such that the operator can release the locking mechanism while grasping the lift arm with both hands. These locking mechanisms typically include a tooth or member that is resiliently biased into engagement with a slotted plate. The operator engages a control that shifts the member out of the slot, and can then shift the lift arm to the desired operating height. The operator then releases the locking control to allow the member to again engage the slotted plate to secure the deck in position.

Many of the lift mechanisms according to the second type are relatively complex and therefore involve the use of a large number of parts. Spring mechanisms are typically utilized to bias the member into engagement with the slotted plate. Therefore these mechanisms are relatively costly to manufacture and assemble.

Therefore, it would be desirable to provide a mower deck lift mechanism that is simple in construction and requires the use of a relatively small number of parts. It would be desirable for a mechanism to allow adjustment of the mower deck height while maintaining the deck in level or horizontal position, and to allow the operator to lift the deck with both of his hands. It would be desirable to provide a locking or securement mechanism that is simple in construction, and that comprises relatively few parts so that the mechanism is inexpensive to manufacture and assemble.

SUMMARY OF THE INVENTION

The present invention provides a mechanism for selectively adjusting the cutting height of a mower deck. A pivotal lift handle is provided having a laterally extending first end portion for engagement with both of the operator's hands. The lift handle is coupled with the deck for shifting the deck vertically as the lift handle pivots. A support member having a plurality of laterally spaced and vertically offset steps engagable with the lift handle is slidably carried by the vehicle frame and is selectively shiftable laterally by the operator to support the lift handle at a plurality of heights corresponding to respective lateral positions of the support member. A pivot rod member is pivotally coupled with the vehicle and is coupled with the support member for guiding the support member through a laterally extending arc. The pivot member is engagable by the thumbs of the operator to cause lateral shifting of the support member as the operator grasps and lifts the lift handle. A plurality of indexing means corresponding with respective step means are carried by the frame and engage the support member for blocking the support member from shifting laterally when the lift handle is not being lifted by the operator. The weight of the deck presses the lift handle downwardly against the support member to prevent the support member from shifting upwardly and laterally past the indexing means during ordinary mowing operation.

BRIEF DESCRIPTION OF THE DRAWINGS

FIG. 3 is partially exploded side view of the first embodiment of the present invention.

FIG. 4 is a perspective view of a second embodiment of the present invention.

FIG. 5 is a plan view of the support member in engagement with the upstanding ridges according to the second embodiment.

DESCRIPTION OF THE PREFERRED EMBODIMENT

Figure 1:
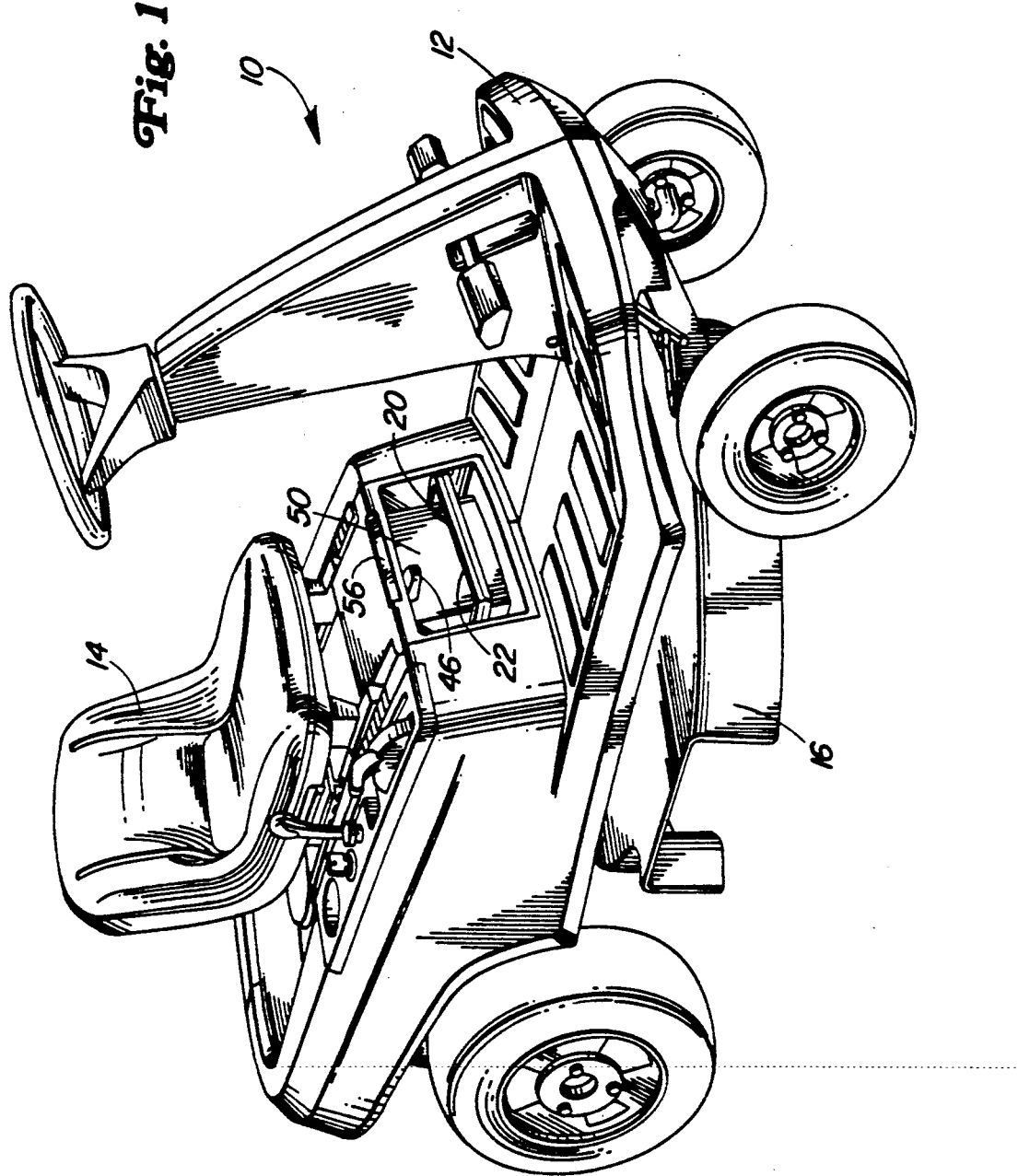
FIG. 1 is a perspective view of a vehicle provided with the present invention.

Referring now to FIG. 1, there is shown a powered vehicle 10 with which the present invention may be used. The vehicle 10 includes a frame 12, an operator seat 14, and a mower deck 16 for cutting vegetation.

Figure 2:
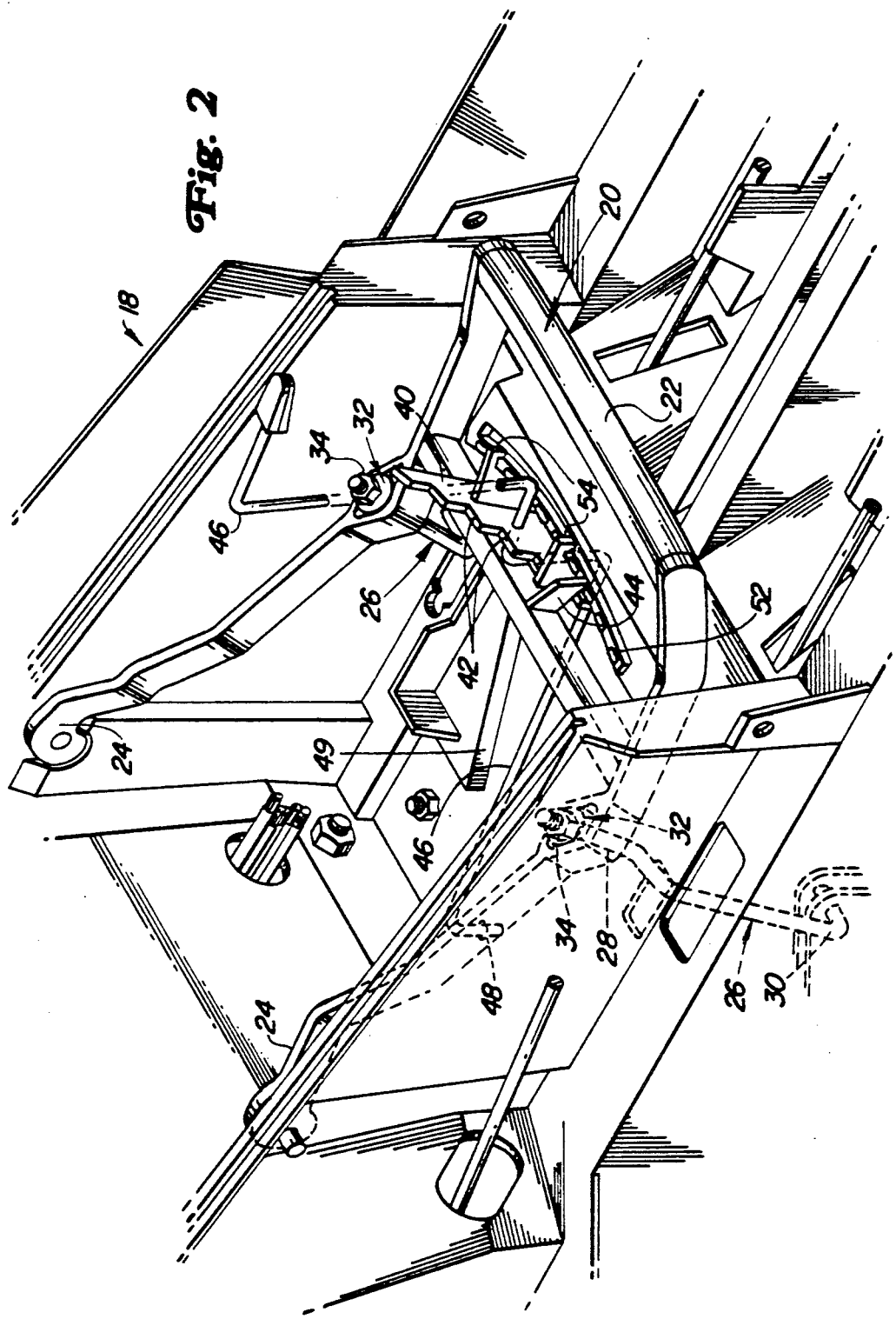
FIG. 2 is a perspective view of a first embodiment of the present invention within the compartment of the vehicle.

A lift mechanism 18 according to a first embodiment, as best seen in FIGS. 2 and 3, is provided by the present invention for adjusting the cutting height of the mower deck 16. A lift handle 20 formed of a plastic material is carried beneath the seat 14 and has a first end portion 22 for engagement with the operator's hand and a second end portion 24 pivotally coupled with the vehicle 10. A pair of laterally spaced link members or rod means 26 include first end portions 28 pivotally coupled with the lift handle 20, and second end portions 30 pivotally coupled with the deck 16. The rod means 26 are coupled to the lift handle 20 between the lift handle's first and second end portions 22 and 24 via ball and socket mechanisms 32. Generally spherical sockets are formed in the lift handle 20 and pivotally receive mating ball members. Nuts 34 engaged with threads formed in the first end portions 28 of the rods 26 act to support the rods 26 within the balls. The rods 26 and deck 16 are thereby coupled with the lift handle 20 for vertical shifting as the operator raises or lowers the lift handle 20. The preferred embodiment of the present invention provides a four bar linkage 36 coupled between the vehicle frame 12 and the deck 16 for maintaining the deck 16 in a generally horizontal position throughout the deck's vertical range of motion. The four bar linkage 36 includes four rods 38 pivotally coupled between the mower deck 16 and the vehicle 10.

The present invention also provides a mechanism for securing the deck 16 in a plurality of particular vertical cutting positions. A support member 40 is slidably carried by the vehicle frame 12 for lateral shifting upon engagement by the operator. The support member 40 includes a plurality of laterally spaced and vertically offset steps 42 engagable with a finger portion 44 of the lift handle 20 for supporting the lift handle 20 at a variety of heights corresponding to respective lateral positions of the support member 40. A pivot member or pivot rod 46 is rigidly coupled with the support member 40 and is pivotally received by a hole 48 formed in the vehicle frame 12. The pivot rod 46 pivots within the hole 48 and guides the support member 40 through a laterally extending arc. A pie-shaped recess 49 is formed in the floor of the compartment, and provides the pivot rod with space to swing laterally beneath a battery (not shown) that is also carried within the compartment. The pivot rod 46 extends forwardly from the support member 40 and through a compartment cover 50 into the operator station such that the operator can selectively shift the pivot rod 46 laterally to secure the deck !6 at a different cutting height. A plurality of raised indexing means 52 are provided corresponding to respective step means 42. The indexing means 52 are formed integral with the frame 12 and are engagable with hooked portions 54 formed by the support member 40. The indexing means 52 thereby block the support member 40 from shifting laterally when the lift handle 20 is not being lifted by the operator. The hooked portions 54 and pivot rod 46 help support the support member 40 in an upright fashion during operation.

Next, the operation of the present invention will be discussed. To adjust the cutting height of the mower deck 16 the operator grasps the lift handle 20 with both hands while remaining seated on the vehicle seat 14. He lifts the lift handle 20, thereby pivoting the lift handle 20 upwardly about its pivotal connection with the frame 12. As the lift handle 20 pivots, the rods 26 and deck 16 also shift upwardly. When the operator lifts the lift handle 20, the weight of the lift handle 20 and deck 16 thereattached is removed from the support member 40. The support member 40 is therefore allowed to shift laterally across the indexing means 52 to a new position. The operator can move the support member 40 laterally with his thumbs as he grasps the lift handle 20 with both hands. The operator can thereby shift the pivot rod 46 into a position corresponding to the desired cutting height. A cutting height indicator 56, as best seen in FIG. 1, may be carried on the wall of the operator station near the pivot rod 46. Laterally spaced numerals may be provided by the cutting height indicator to represent the cutting height associated with respective steps 42 formed in the support member 40, such that the operator will know where to position the pivot rod 46 to achieve a particular cutting height. The lift handle 20 can then be lowered such that the lift handle 20 comes to rest on the step means 42 corresponding to the desired cutting height. Once lowered, the weight of the lift arm 20 and deck 16 press the support member downwardly toward the vehicle frame 12. The indexing means 52 act to block lateral shifting of the support member 40 when the support member 40 is pressed downwardly during operation. The height of the deck 16 is thereby prevented from shifting unexpectedly. The deck 16 may encounter loads that force the deck 16 upwardly during periods of rough operation, such as when traveling across bumpy terrain. When the deck 16 is forced to shift upwardly, the weight of the deck 16 does not bear down on the lift handle 20, and therefore the lift handle 20 does not press the support member 40 downwardly against the frame 12. If the pivot rod 46 is urged to shift upwardly during rough operation the pivot rod 46 will abut the battery situated directly above the rod 46. The pivot rod 46 is thereby generally blocked from shifting upwardly, and the support member 40 remains at the desired location selected by the operator.

To adjust the height of the deck 16, the operator lifts the lift handle 20 and slides the pivot rod 46 laterally to a desired position. As the operator applies a force to the pivot rod 46, a torque load is transferred to the pivot rod 46. A torque load in the pivot rod 46 would tend to press the leading portion of the laterally shifting support member 40 downwardly against the indexing means 52. For example, if an operator shifts the pivot rod 46 to the left as shown in FIG. 2, the force applied by his hand will urge the pivot rod 46 and support member 40 there attached to pivot counterclockwise. The left or leading edge of the support member 40 would thereby be forced downwardly against the frame 12 and the indexing means 52. This downward shifting of the leading edge of the support member 40 might make it difficult for the operator to shift the support member 40 over and across the indexing means 52. However, since the pivot rod 46 is received by the hole 48, the torque is largely transferred from the pivot rod 46 to the frame 12 via the hole 48, and the support member is prevented from rotating or tilting. The pivot rod 46 received by the hole 48 maintains the support member 40 in level fashion as it shifts across the indexing means 52 and absorbs the torque transferred from the operator's hand. The pivot rod 46 and support member 40 are thereby relatively easily shifted laterally by the hand of the operator.

Referring now to FIG. 4, there is illustrated a second embodiment of the present invention. A support member 140 is shown coupled with the pivot rod 46 for swinging therewith in an arc about the hole 48. The support member 140 is slidably received by a pair of upstanding ridges 158 that extend laterally in an arc and are formed in the vehicle frame 12. The support member 140 includes steps 142 laterally spaced and vertically offset for supporting the lift handle 20 at a plurality of different heights. Each step 142 is rounded at its peak 159 to snuggly receive a mating rounded portion 160 formed in the finger portion 144 of the lift handle 20. The peaks 159 of the steps 142 are longitudinally staggered or offset from each other, as best seen in FIG. 5, to accomodate the longitudinal shifting of the finger member 144 as it swings about the rear pivot point of the handle 20. The steps 142 are generally pyramidal in shape and each include a base portion 162 that helps maintain the support member 140 in an upright fashion. The taller steps include vertically extending grooves 164 that receive the upstanding ridges 158. The ridges 158 received in the grooves 164 also help maintain the support member 140 in an upright fashion. An indexing means 152 according to the second embodiment includes recesses 166 formed in the upstanding ridges 158 for receiving the pivot rod 46 at respective cutting heights. The weight of the deck 16 and lift handle 20 act to secure the pivot rod 46 within the recesses 166 during operation.

I claim:

1. A mechanism for selectively adjusting the cutting height of a mower deck carried by a vehicle having a frame, said mechanism comprising:
    a lift handle having a laterally extending first end portion for engagement with the operator's hand and a second end portion pivotally coupled with the vehicle, said lift handle being coupled with the deck for shifting the deck vertically as the lift handle pivots;
    a support means slidably carried by the vehicle frame and selectively shiftable laterally by the operator, said support means having a plurality of laterally spaced and vertically offset step means engagable with the lift handle for supporting the lift handle at a plurality of heights corresponding to respective lateral positions of the support means.

2. The invention of claim 1, wherein:
    the first end portion of the lift handle extends laterally for being grasped by both of the operator's hands;
    said support means is positioned adjacent the first portion of the lift handle for engagement with the thumbs of the operator to cause lateral shifting of the support means as the operator grasps and lifts the lift handle.

3. The invention of claim 1, and further comprising a pivot member pivotally coupled with the vehicle for swinging about a vertical axis, said pivot member being rigidly coupled with the support means for guiding the support member through a laterally extending arc about said vertical axis.

4. The invention of claim 3, and further comprising a plurality of indexing means corresponding with respective step means, said indexing means being carried by the frame and engagable with the support means for blocking the support member from shifting laterally when the lift handle is not being lifted by the operator.

5. The invention of claim 4, wherein:
    the weight of the deck presses the lift handle downwardly against the support member to prevent the support member from shifting upwardly and laterally past the indexing means during mowing operation.

6. The invention of claim 3, wherein the pivot member further comprises a pivot rod rigidly coupled with the support means and pivotally received by a hole formed in the vehicle frame for establishing a vertical axis about which the pivot rod and support means pivot.

7. A mechanism for selectively adjusting the cutting height of a mower deck carried by a vehicle having a frame, said mechanism comprising:
    a lift handle having a laterally extending first end portion for engagement with both of the operator's hands, and a second end portion pivotally coupled with the vehicle frame, said lift handle being coupled with the deck for shifting the deck vertically as the lift handle pivots;
    a support member slidably carried by the vehicle frame and selectively shiftable laterally by the operator, said support member having a plurality of laterally spaced and vertically offset step means engagable with the lift handle for supporting the lift handle at a plurality of heights corresponding to respective lateral positions of the support member;
    a pivot member pivotally coupled with the vehicle for swinging about a vertical axis, said pivot member being rigidly coupled with the support member for guiding the support member through a laterally extending arc about said vertical axis, said pivot member extending to a position adjacent the first portion of the lift handle for engagement by the thumbs of the operator to cause lateral shifting of the support member as the operator grasps and lifts the lift handle;
    a plurality of indexing means corresponding with respective step means, said indexing means being carried by the frame and engagable with the support member for blocking the support member from shifting laterally when the lift handle is not being lifted by the operator.

8. The invention of claim 7, wherein the weight of the deck presses the lift handle downwardly against the support member to prevent the support member from shifting upwardly and laterally past the indexing means during operation.

9. The invention of claim 7, wherein the pivot member further comprises a pivot rod rigidly coupled with the support member and pivotally received by a hole formed in the vehicle frame for establishing a vertical axis about which the pivot rod and support member pivot

* * * * *